(12) United States Patent
Furui et al.

(10) Patent No.: US 7,323,797 B2
(45) Date of Patent: Jan. 29, 2008

(54) POWER TOOL (75) Inventors: Nobuyasu Furui, Anio (JP); Shuji Yoshikawa, Anio (JP)

(73) Assignee: Makita Corporation, Anjo-shi, Aichi (JP)

( * ) Notice: Subject to any disclaimer, the term of this patent is extended or adjusted under 35 U.S.C. 154(b) by 130 days.

(21) Appl. No.: 11/191,253

(22) Filed: Jul. 27, 2005

(65) Prior Publication Data

US 2006/0290213 A1    Dec. 28, 2006

(30) Foreign Application Priority Data

Jul. 29, 2004   (JP)   ............................... 2004-222564

(51) Int. Cl.
- H02K 9/00     (2006.01)
- H02K 7/14     (2006.01)
- H02K 37/00    (2006.01)
- B25F 5/00     (2006.01)

(52) U.S. Cl. .......................................... 310/58; 310/47
(58) Field of Classification Search ................... 310/58, 310/62–63, 64, 239, 242, 245, 40 MM, 80, 310/47

See application file for complete search history.

(56) References Cited

U.S. PATENT DOCUMENTS

| | | | | |
|---|---|---|---|---|
| 3,413,498 A | * | 11/1968 | Bowen, III et al. | 310/47 |
| 3,584,248 A | * | 6/1971 | Higashino et al. | 310/68 R |
| 3,829,721 A | * | 8/1974 | Rosenthal, Jr. | 310/47 |
| 3,919,574 A | * | 11/1975 | Schmuck | 310/68 R |
| 4,516,047 A | * | 5/1985 | Duverger | 310/230 |
| 5,053,657 A | * | 10/1991 | Ikegami et al. | 310/63 |
| 5,345,132 A | * | 9/1994 | Sasaki et al. | 310/239 |
| 5,714,810 A | * | 2/1998 | Yuhi et al. | 310/40 MM |
| 6,528,921 B1 | * | 3/2003 | Nakane | 310/239 |
| 6,740,995 B2 | | 5/2004 | Oohashi et al. | |

FOREIGN PATENT DOCUMENTS

| | | | |
|---|---|---|---|
| JP | 2002101614 A | | 4/2002 |
| JP | 2002127047 A | * | 5/2002 |
| JP | 2002142403 A | * | 5/2002 |

OTHER PUBLICATIONS

JP laid-open publication of utility model No. 57-111068.

* cited by examiner

Primary Examiner—Tran Nguyen
(74) Attorney, Agent, or Firm—Orrick, Herrington & Sutcliffe, LLP (57) ABSTRACT

It is an object of the invention to provide an effective technique for making compact power tool having an electric motor. A representative power tool may include a tool bit, housing and an electric motor. The electric motor is housed in the housing and drives the tool bit. The electric motor includes an output shaft, a commutator, an armature, brushes, brush holders, a brush holder base, a cooling fan and a cooling-fan facing surface. The cooling-fan facing surface is formed on the brush holder base. The cooling-fan facing surface faces the cooling fan and extends flat in the centrifugal direction to guide the discharged cooling air from the cooling fan in the centrifugal direction. Because the brush holder base not only secures the brush holder but also smoothly guides the cooling air by means of the cooling-fan facing surface, the size of the electric motor in the axial direction of the output shaft can be reduced.

11 Claims, 7 Drawing Sheets

POWER TOOL

BACKGROUND OF THE INVENTION

1. Field of the Invention

The present invention relates to a technique of constructing a power tool having an electric motor.

2. Description of the Related Art

Japanese non-examined laid-open Utility Model Publication No. 57-111068 discloses an electric motor including an output shaft, a commutator and an armature fitted onto the output shaft and rotate together with the output shaft, brushes that supply current in sliding contact with the outer circumferential surface of the commutator, brush holders that house the respective brushes, a brush holder base that hold the brush holders, a cooling fan that rotates together with the output shaft and serves to cool the armature by means of cooling air, and a housing that houses these components. Further, according to the known electric motor, in order to ensure the smooth flow of the cooling air for cooling the armature via the cooling fan, a baffling member for guiding the cooling air is provided in a flow passage of the cooling air.

In a power tool having an electric motor of this type, it is desired to further improve the construction for guiding the cooling air particularly in order to reduce the size in the axial direction of the output shaft of the electric motor so that the power tool can be made compact.

SUMMARY OF THE INVENTION

Accordingly, it is an object of the present invention to provide an effective technique for making compact power tool having an electric motor.

According to the present invention, a representative power tool may include a tool bit, housing and an electric motor. The electric motor is housed in the housing to drive the tool bit. Further, the electric motor includes an output shaft, a commutator, an armature, brushes, brush holders, a brush holder base, a cooling fan and a cooling-fan facing surface. The output shaft is connected to the tool bit. The commutator and the armature are fitted onto the output shaft and rotate together with the output shaft. The brushes supply current in sliding contact with an outer periphery of the commutator. The brush holders house the respective brushes. The brush holders are respectively secured to the brush holder. The cooling fan is disposed between the brush holder base and the armature in the axial direction of the output shaft. The cooling fan rotates together with the output shaft to take a cooling air into the cooling fan and discharge the cooling air in a centrifugal direction that crosses the axial direction of the output shaft.

The cooling-fan facing surface is formed on the brush holder base. The cooling-fan facing surface faces the cooling fan and extends flat in the centrifugal direction to guide the discharged cooling air from the cooling fan in the centrifugal direction of the cooling fan. Because the brush holder base not only secures the brush holder but also smoothly guides the cooling air by means of the cooling-fan facing surface, the size of the electric motor in the axial direction of the output shaft can be reduced and therefore, the power tool can be entirely made compact, compared with the known art.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide improved power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
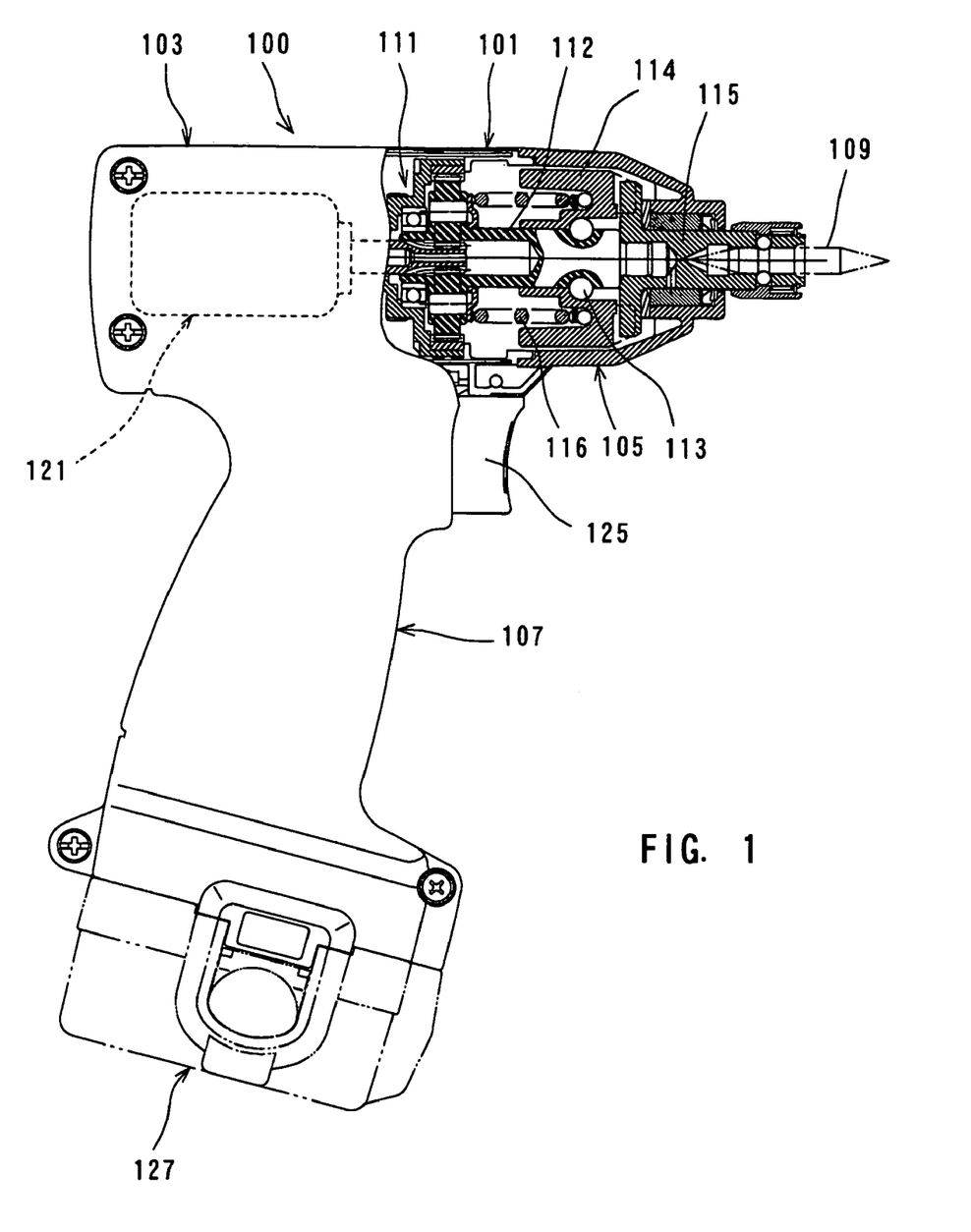
FIG. 1 is a side view, partly in section, schematically showing an entire impact driver 100 according to the representative embodiment of the invention.

A power tool according to a representative embodiment of the present invention will now be described with reference to the drawings. FIG. 1 is a side view, partly in section, schematically showing an entire electric (battery-powered) impact driver 100 as a representative embodiment of the power tool according to the present invention. As shown in FIG. 1, the representative impact driver 100 includes a body 101 and a driver bit 109. The driver bit 109 is detachably coupled to the tip end region of the body 101 and adapted to tighten various types of screws. The driver bit 109 is a feature that corresponds to the "tool bit" according to the present invention.

The body 101 includes a motor housing 103, a gear housing 105 and a handgrip 107. The motor housing 103 houses a driving motor 121. A trigger 125 is mounted on the handgrip 107, and depressing the trigger 125 turns on a power switch (not shown). The gear housing 105 houses a speed reducing mechanism 111, a spindle 112, a hammer 114 and an anvil 115.

The speed reducing mechanism 111 mainly includes a planetary gear and appropriately reduces the speed of rotation of an output shaft 122 of the driving motor 121. The spindle 112 is rotated by the speed reducing mechanism 111. The rotation of the spindle 112 causes the hammer 114 to rotate via a transmitting member in the form of a ball 113, which in turn causes the anvil 115 to rotate. The hammer 114 can move with respect to the spindle 112 in its longitudinal direction and is urged toward the anvil 115 by a compression spring 116. An end of the anvil 115 protrudes from the end of the gear housing 105, and the driver bit 109 is detachably coupled to the protruded end of the anvil 115.

When the trigger 125 is depressed to turn on the power switch and the driving motor 121 is driven, the driver bit 109 is caused to rotate via the speed reducing mechanism 111, the spindle 112, the hammer 114 and the anvil 115. Thus, a screw tightening operation is performed.

When the driving motor 121 is driven for a screw tightening operation and the screw tightening torque of the driver bit is low, the spindle 112 and the hammer 114 rotate together. Under such low-load conditions, the hammer 114 is held in engagement with the anvil 115 by the biasing force of the compression spring 116. Thus, the anvil 115 also rotates together with the hammer 114, so that the driver bit 109 performs a screw-tightening operation.

When the tightening torque is increased to a predetermined high level, the hammer 114 moves away from the anvil 115 against the biasing force of the compression spring 116. Thereafter, the hammer 114 engages with the anvil 115 as carrying impulsive rotating torque by the biasing force of the compression spring 116. Thus, high tightening torque is produced on the driver bit 109 via the anvil 115.

The driving motor 121 is a four-pole DC motor powered by the battery 127. The construction of the driving motor 121 and its surrounding parts will now be described with reference to FIGS. 2 to 7.

Figure 2:
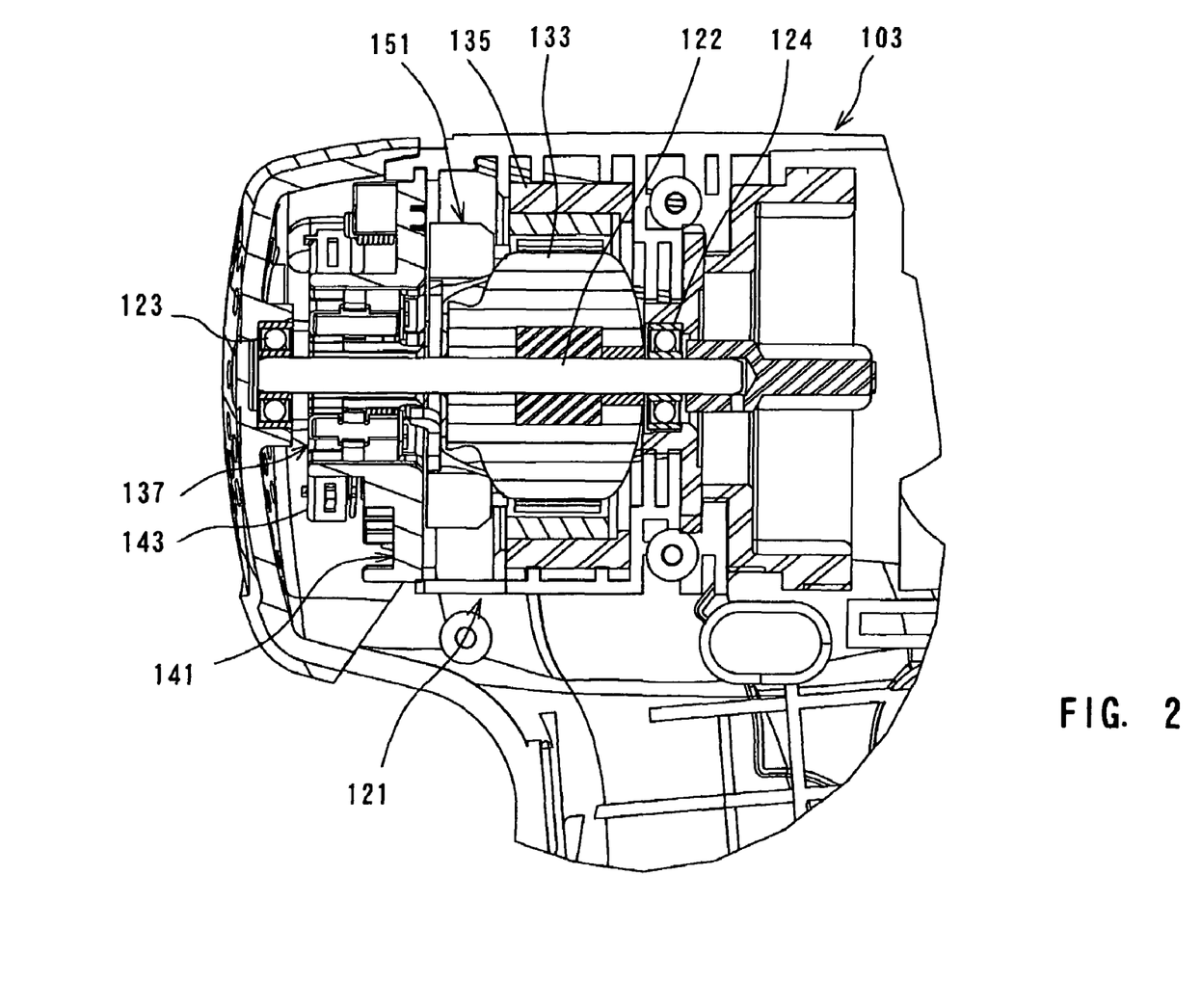
FIG. 2 is a sectional view showing the structure of a driving motor 121 according to the embodiment.

FIG. 2 shows the structure of the driving motor 121 in section. As shown, the driving motor 121 includes an output shaft 122, a cooling fan 151 that rotates together with the output shaft 122, an armature 133 that also rotates together with the output shaft 122, a stator 135 secured to the motor housing 103, a commutator 137 fitted onto the output shaft 122 near its end (which is remote from the speed reducing mechanism 111 shown in FIG. 1), four brushes 145 (shown in FIG. 3) that supply current in sliding contact with the outer periphery of the commutator 137, four brush holders 143 that house the respective brushes, and a generally disc-like brush holder base 141 to which the brush holders 143 are respectively secured.

One end (rear end) of the output shaft 122 is rotatably supported on the motor housing 103 via a bearing 123. The other end (on the side of the speed reducing mechanism) of the output shaft 122 is rotatably supported on the gear housing 103 via a bearing 124. The cooling fan 151 is arranged as a centrifugal fan and is disposed between the armature 133 and the commutator 137. The cooling fan 151 takes in (guides in) air from the armature 133 side and the commutator 137 side and discharges (guides out) the intake air in a centrifugal direction. In this manner, the cooling fan 151 serves to cool the commutator 137, brushes 145 (shown in FIG. 3), the armature 133 and their surrounding parts by helping their heat dissipation. The air that has been used for such cooling by the cooling fan 151 is discharged to the outside through vents 103a (shown in FIG. 7) that are formed in the motor housing 103.

Figure 3:
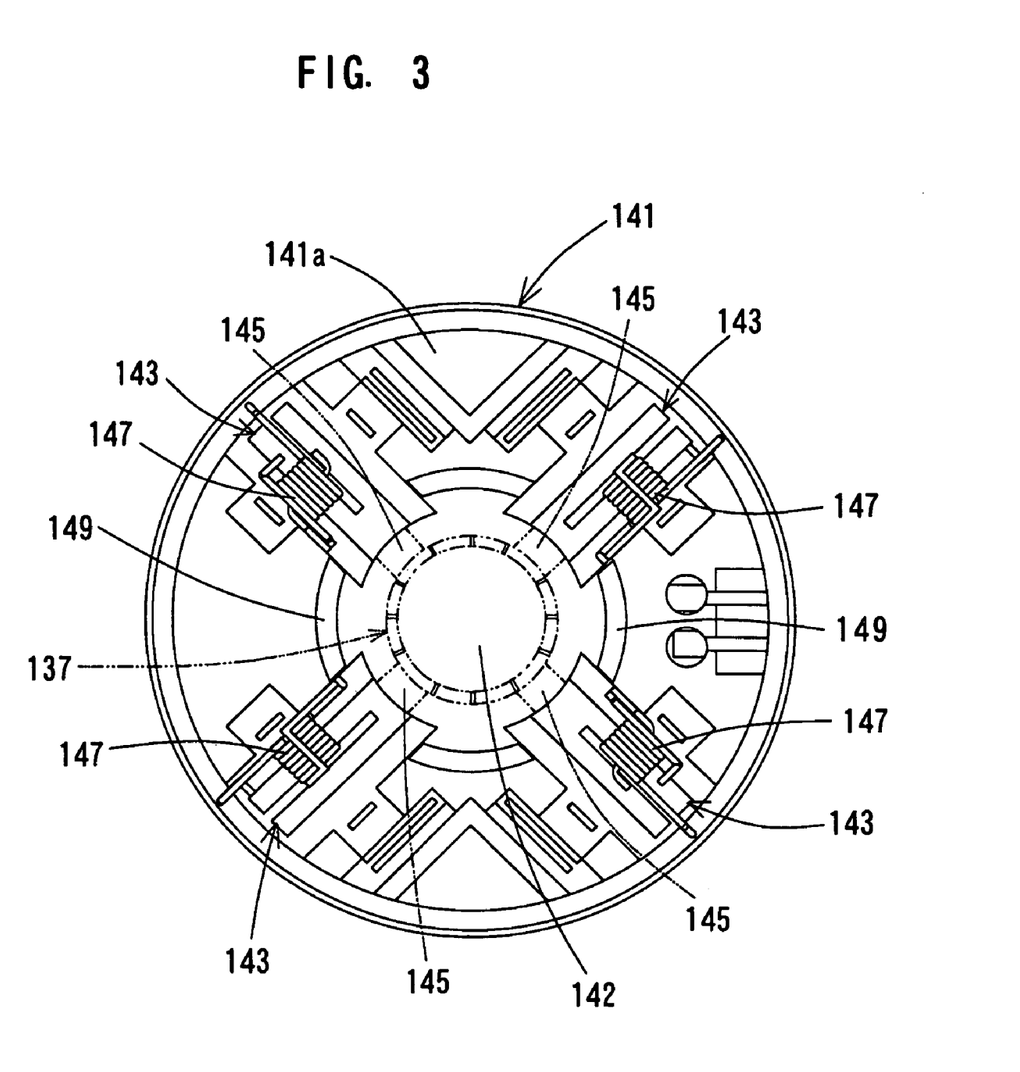
FIG. 3 is a plan view of a brush holder base 141 of the driving motor 121 according to the embodiment.

The construction of the brush holder base 141 of the driving motor 121 in this embodiment is shown in FIG. 3 in plan view.

As shown in FIG. 3, the brush holder base 141 has a generally disc-like shape having a circular through hole 142 in its center. The commutator 137 (see FIG. 2) can extend through the through hole 142. The brush holder base 141 is secured to the inner wall surface of the motor housing 103 by a fastening means such as a screw. The brush holder base 141 includes an insulating material having a slightly larger outside diameter than the cooling fan 151. Four brush holders 143 are arranged at equal intervals of 90° with respect to each other around the through hole 142 and secured to a rear surface 141a (on the side opposite to the cooling fan 151) of the brush holder base 141. A brush 145 (see FIG. 3) is slidably disposed within each of the brush holders 143. Thus, the brush holder base 141 performs a brush holder securing function of securing the brush holder 143. Each of the brushes 145 is urged by a torsion spring 47 in such a manner as to be pressed onto the outer peripheral surface of the commutator 137 generally perpendicularly from the radial direction.

When the power to the driving motor 121 is turned on, current is supplied to the coil on the armature 133, and the armature 133 and the output shaft 122 are caused to rotate together. At this time, the commutator 137 and the brushes 145 appropriately change the direction of current that passes through the coil of the armature 133 such that the armature 133 and the output shaft 122 can continuously rotate in a predetermined direction. The output shaft 122, the armature 133 and the commutator 137 form a "rotor" that rotates with respect to the fixed-side elements of the driving motor 121.

The four brushes 145 are connected to the positive electrode and the negative electrode of the battery 127 in such a manner that two brushes 145 on the diametrically opposite sides of the through hole 142 make one pair. Further, an air guide wall 149 (see FIG. 3) having an arcuate cross section is disposed between the brush holders 143 and faces the outer peripheral surface of the commutator 137 with a predetermined spacing therefrom. The air guide walls 149 extend in the axial direction of the output shaft 122. Thus, on the rear surface 141a side of the brush holder base 141, the cooling air that has been taken in through an opening (not shown) in the rear of the motor housing 103 is guided to the cooling fan 151 along the peripheral surface of the commutator 137.

Figure 4:
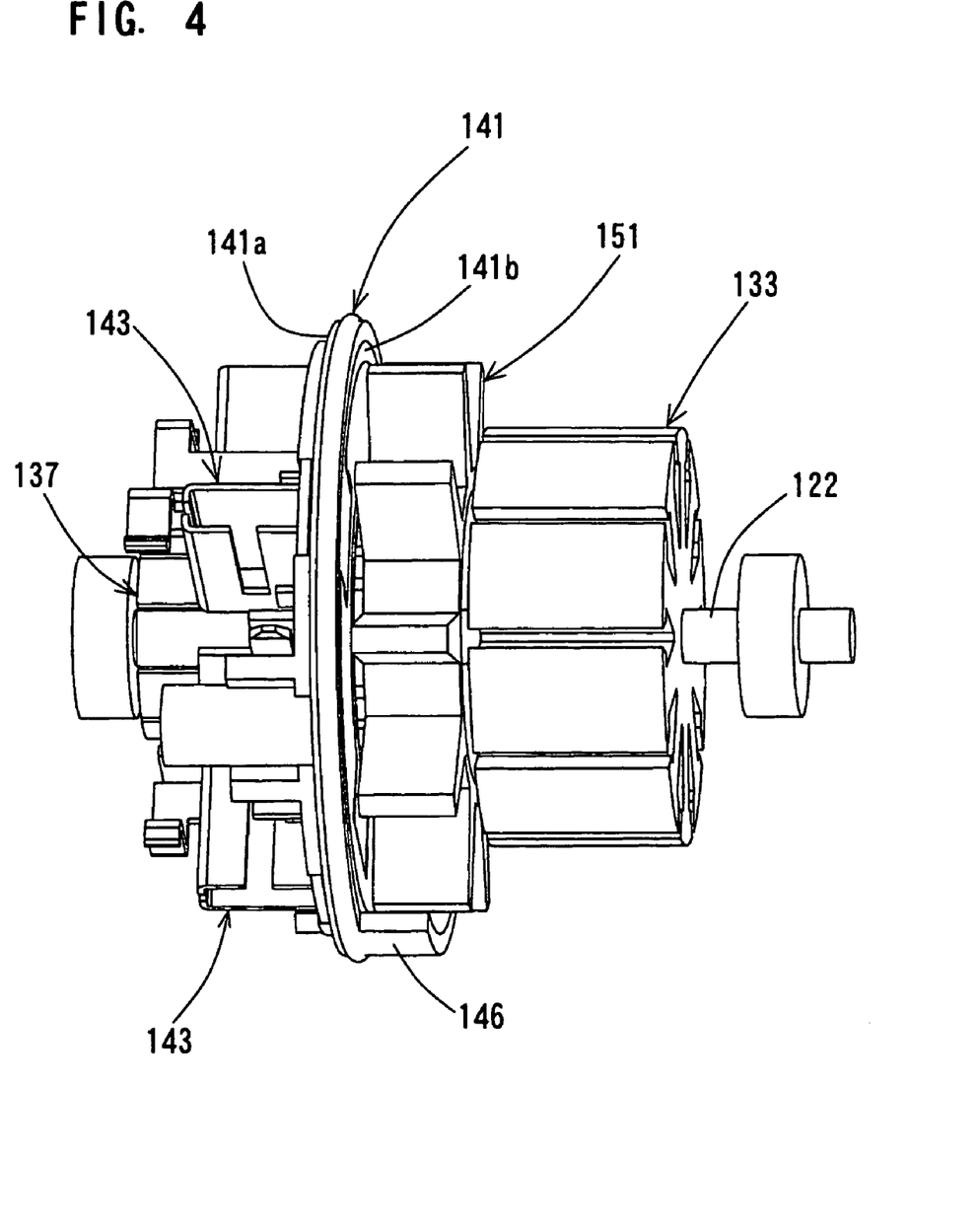
FIG. 4 is a perspective view showing the construction of the brush holder base 141 and its surrounding parts according to the embodiment.
Figure 5:
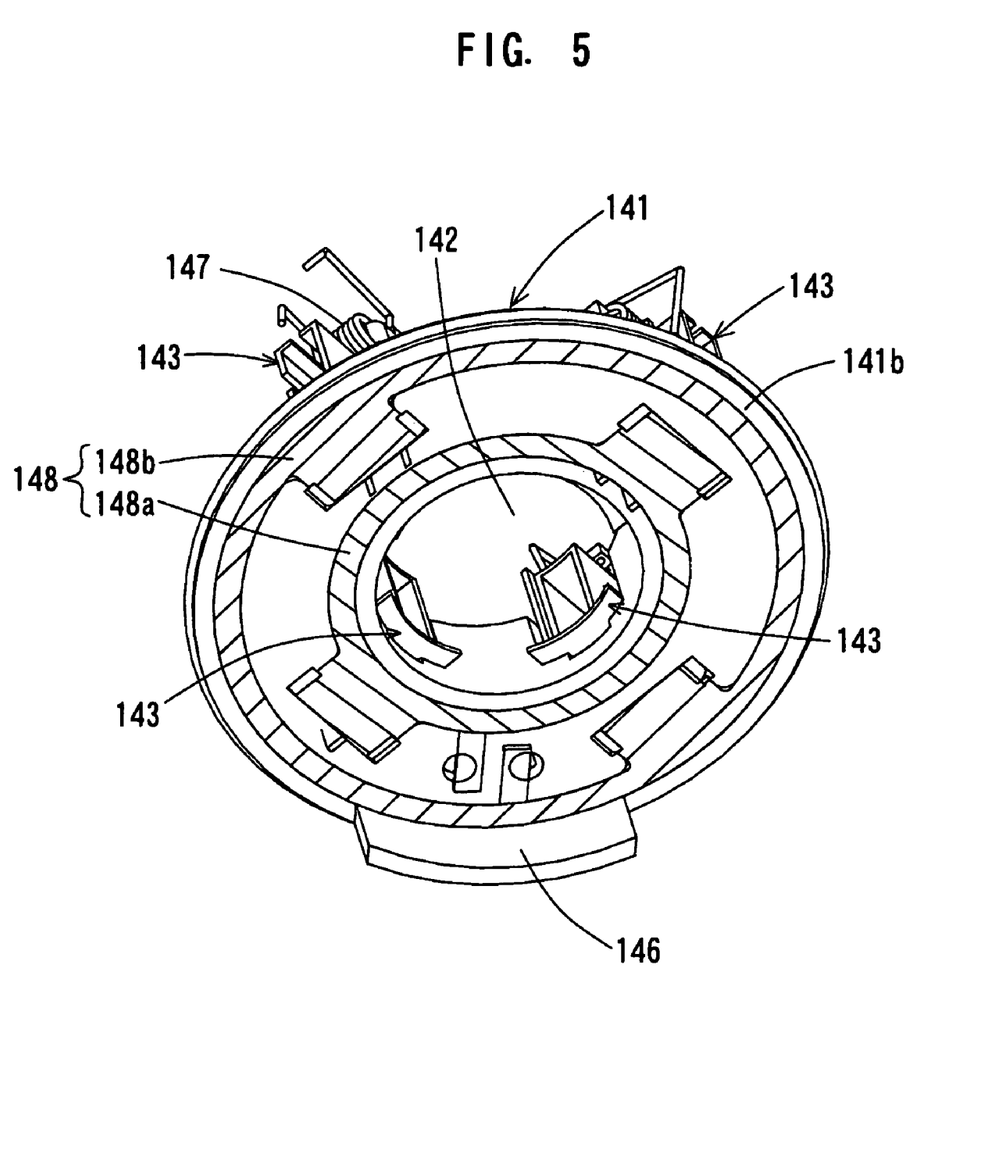
FIG. 5 is also a perspective view showing the construction of the brush holder base 141 and its surrounding parts according to the embodiment.
Figure 6:
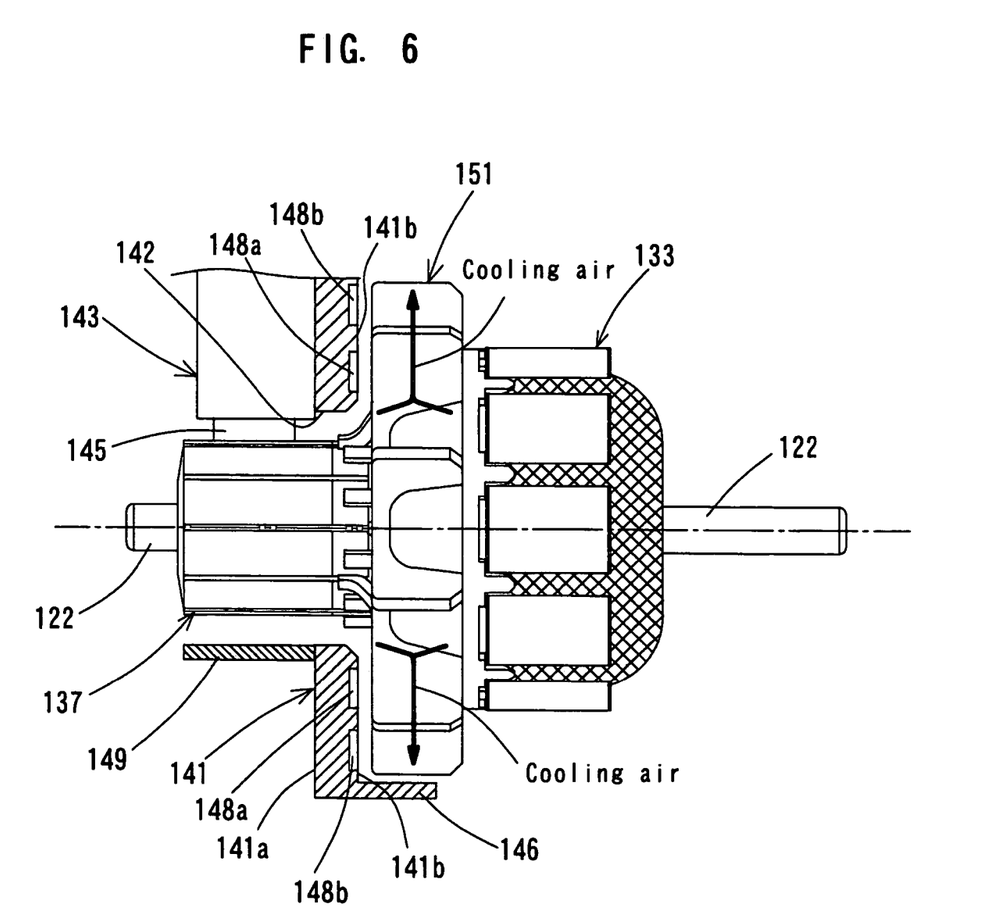
FIG. 6 is a partially sectional view showing the construction of the brush holder base 141 and its surrounding parts according to the embodiment.
Figure 7:
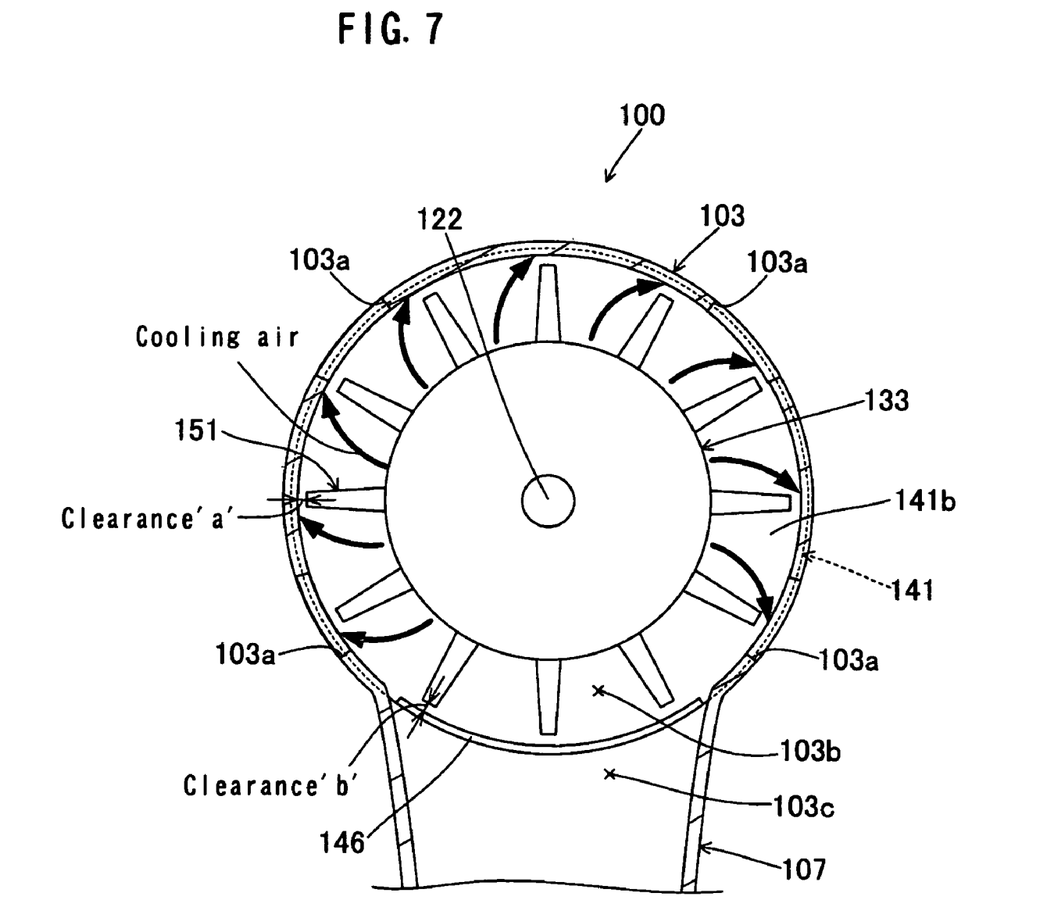
FIG. 7 schematically shows the arrangement of an extending portion 146 of the brush holder base 141 according to the embodiment.

Further, the construction of the brush holder base 141 of the driving motor 121 in this embodiment and its surrounding parts is shown in perspective view in FIGS. 4 and 5 and partially in section in FIG. 6. The arrangement of an extending portion 146 of the brush holder base 141 in this embodiment is schematically shown in FIG. 7.

As shown in FIGS. 4 to 6, a front surface 141b of the brush holder base 141 faces the cooling fan 151. In this embodiment, the front surface 141b is a generally flat surface that extends from an inner edge of the brush holder base 141 defined by the through hole 142, in the centrifugal direction perpendicular to the axial direction of the output shaft 122. The front surface 141b is configured to have as flat a surface as possible. The front surface 141b is a feature that corresponds to the "cooling-fan facing surface" in the invention. With this construction, when the cooling fan 151 is driven, both the cooling air which has been taken in (guided in) from the armature 133 side to the cooling fan 151 and the cooling air which has been taken in (guided in) from the rear surface 141a side to the front surface 141b side of the brush holder base 141 through the inside of the air guide wall 149, are guided along the front surface 141b of the brush holder base 141 and smoothly discharged in the centrifugal direction. Specifically, the brush holder base 141 in this embodiment has a brush holder securing function of the rear surface 141a as mentioned above and also has a function (baffling function) as a cooling air guiding surface for smoothly guiding cooling air via the front surface 141b.

With such construction of the brush holder base 141 in this embodiment, the size in the axial direction of the output shaft 122 can be reduced, so that the impact driver 100 can be made compact, compared with a construction, for example, in which, besides a brush holder base, a separate air guide member is provided along the axial direction of the output shaft 122. Further, the reduction of the size in the axial direction of the output shaft 122 allows the increase of the fan rib height (fan blade height) of the cooling fan 151 in the axial direction of the output shaft 122, which is effective in constructing a cooling fan having higher cooling effectiveness. Further, the brush holder base 141 have the brush holder securing function and the cooling air guiding function (baffling function) as well, so that the number of parts of the driving motor 121 can be reduced.

Further, as shown in FIGS. 4 to 6, the brush holder base 141 has an extending portion 146 on the lower outer edge (on the handgrip 107 side) of the front surface 141b. The extending portion 146 is a plate piece formed on the lower arc of the brush holder base 141 partially along the outer periphery of the cooling fan 151 at substantially the same curvature as this outer periphery such that the extending portion 146 partially covers the outer periphery of the cooling fan 151 in the radial direction. The plate piece extends below the cooling fan 151 (on the handgrip 107 side) in the axial direction of the output shaft 122. The extending length of the extending portion 146 (the length in the axial direction of the output shaft 122) is substantially the same as or slightly longer or slightly shorter than the fan rib height. The extending portion 146 having such configuration partially covers the outer periphery of the cooling fan 151 so as to prevent the cooling air from flowing in the centrifugal direction to the handgrip 107 side. Thus, as shown in FIG. 7, the extending portion 146 of the brush holder base 141 partitions the motor housing 103 into a first space 103b that accommodates the driving motor 121 and a second space 103c that is adjacent to the first space 103b and defines the inner space of the handgrip 107. The extending portion 146 is a feature that corresponds to the "cooling-air control element" in this invention.

With such construction of the brush holder base 141, when the cooling fan 151 is driven and the cooling air is guided to the front surface 141b side of the brush holder base 141 and led in the centrifugal direction of the cooling fan 151, the extending portion 146 serves to prevent the cooling air from flowing downward from the first space 103b to the second space 103c on the handgrip 107 side. Thus, as shown in FIG. 7, the cooling air flowing in the centrifugal direction via the cooling fan 151 is allowed to flow out of the first space 103b to the outside of the housing through the vents 103a, while the cooling air is prevented from flowing downward from the first space 103b to the second space 103c. In other words, the extending portion 146 performs a cooling air guiding function (baffling function) of guiding the cooling air that flows in the centrifugal direction via the cooling fan 151, to the vents 103a by blocking the influence of the second space 103c. Thus, the brush holder base 141 having the extending portion 146 can prevent generation of turbulent flow of the cooling air and guides the cooling air in such a manner as to form smoother flow. Particularly by providing the extending portion 146 formed partially along the outer periphery of the cooling fan 151 at substantially the same curvature as this outer periphery, the effectiveness of preventing generation of turbulent flow of the cooling air can be enhanced. Further, as shown in FIG. 7, clearances "a" and "b" between the outer end surface of the blade of the cooling fan 151 and the inner peripheral surface of the motor housing 103 and the inner peripheral surface of the extending portion 146 are made uniform, which is effective in reducing or alleviating turbulence of the cooling air and noise caused by such turbulence.

The extending portion 146 may be a plate piece of any configuration formed partially along the outer periphery of the cooling fan 151 at substantially the same curvature as this outer periphery such that the extending portion 146 partially covers the outer periphery of the cooling fan 151 in the radial direction. The width of the extending portion 146 extending along the lower arc of the brush holder base 141 and its extending length in the axial direction of the output shaft 122 can be appropriately chosen according to the specifications of the electric motor or the power tool, or other similar conditions.

Further, as shown in FIGS. 5 and 6, the brush holder base 141 has a heat conductive part 148 (diagonally shaded areas in FIG. 5) in the front surface 141b. The heat conductive part 148 is made of a metal material such as copper and aluminum and connected to the brush holders 143 and exposed on the front surface 141b (the cooling-fan facing surface). Further, the heat conductive part 148 is formed flat along the front surface 141b of the brush holder base 141.

In this embodiment, the heat conductive part 148 includes a ring-like (annular) first heat conductive part 148a and a ring-like (annular) second heat conductive part 148b having a larger diameter than the first heat conductive part 148a. The first and second heat conductive parts 148a and 148b electrically connect (short-circuit) the respective pairs of the brush holders 143 which have the same polarity and which are disposed on the diametrically opposite sides of the through hole 142. For example, the first heat conductive part 148a is connected to the pair of the positive side brush holders 143 and the second heat conductive part 148b is connected to the pair of the negative side brush holders 143. According to the embodiment, one heat conductive part has been described as being assigned to two brush holders 143, but one heat conductive part may be assigned to one brush holder 143. The brush holders 143 accommodate the respective brushes 145 which may be heated by sliding contact with the commutator 137, so that the brush holders 143 and the surrounding parts may be heated. Therefore, in this embodiment, the brush holder base 141 is configured to have the heat conductive part 148 having the first and second heat conductive parts 148a and 148b.

With such construction, the first and second heat conductive parts 148a and 148b help transfer the heat of the brush holders 143 and the surrounding parts to the front surface 141b of the brush holder base 141 via the heat conductive parts 148a and 148b. Further, the transferred heat is effectively dissipated by the flow of the cooling air via the cooling fan 151, so that the effectiveness of dissipating heat of the brush holders 143 and the surrounding parts can be enhanced. Preferably, the heat conductive part 148 may be made of metal or ceramic material having as high heat conductivity as possible and configured to have as large a surface area as possible. Thus, the effectiveness of dissipating heat of the brush holders 143 and the surrounding parts can be further enhanced.

According to the embodiment, the brush holder base 141 of the driving motor 121 has been described as having the extending portion 146 and the heat conductive part 148. However, in the present invention, it is necessary for the brush holder base 141 to have at least the front surface 141b (cooling air guiding surface) for guiding cooling air in the centrifugal direction of the cooling fan 151. The extending portion 146 and the heat conductive part 148 may be omitted depending on the specifications of the motor or the power tool, or other similar conditions.

Further, the present invention is not limited to the impact driver 100, but may be applied to various kinds of power tools used for cutting, grinding, polishing or drilling operation. Further, according to the embodiment, the driving motor 121 has been described as being a four-pole DC motor, but the present invention may be applied to a four-pole AC commutator motor, or a DC motor and an AC commutator motor which have two or more poles.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

DESCRIPTION OF NUMERALS 100 impact driver (power tool)
101 body
103 motor housing
103a vent
103b first space
103c second space
105 gear housing
107 handgrip
109 driver bit (tool bit)
111 speed reducing mechanism
112 spindle
113 ball
114 hammer
115 anvil
116 compression spring
121 driving motor (electric motor)
122 output shaft
123 bearing
124 bearing
125 trigger
127 battery
133 armature
135 stator
137 commutator
141 brush holder base
141a rear surface
141b front surface (cooling-fan facing surface)
142 through hole
143 brush holder
145 brush
146 extending portion
147 torsion spring
148 heat conductive part
148a first heat conductive part
148b second heat conductive part
149 air guide wall
151 cooling fan

What we claim is:

1. A power tool comprising:
a tool bit,
a housing, and
an electric motor housed in the housing to drive the tool bit,
the electric motor comprising:
an output shaft connected to the tool bit,
a commutator and an armature that are fitted onto the output shaft and rotate together with the output shaft,
brushes that supply current in sliding contact with an outer periphery of the commutator,
brush holders that house the respective brushes,
a brush holder base to which the brush holders are respectively secured,
a cooling fan disposed between the brush holder base and the armature in the axial direction of the output shaft, the cooling fan rotating together with the output shaft, the cooling fan taking in a cooling air and discharging the cooling air in a centrifugal direction that crosses the axial direction of the output shaft, and
a cooling-fan facing surface formed on the brush holder base, wherein the cooling-fan facing surface faces the cooling fan, is substantially flat, and extends from an inner edge of the brush holder base in the centrifugal direction of the cooling fan to guide the discharged cooling air from the cooling fan in the centrifugal direction of the cooling fan.

2. The power tool as defined in claim 1, wherein the housing includes a first space that accommodates the electric motor, vents through which the first space communicates with the outside of the housing and a second space adjacent to the first space to define an inner space of the handgrip of the power tool body, and wherein the brush holder base includes a cooling-air control element that prevents the cooling air from flowing from the first space to the second space.

3. The power tool as defined in claim 2, wherein the brush holder base includes a plate piece formed partially along an outer periphery of the cooling fan at substantially the same curvature as said outer periphery such that the plate piece partially covers the outer periphery of the cooling fan in the radial direction to prevent the cooling fan from flowing from the first space to the second space.

4. The power tool as defined in claim 1, wherein the brush holder base includes a heat conductive part connected to the brush holders and exposed on the cooling-fan facing surface, thereby allowing heat conduction from the brush holder side to the cooling-fan facing surface side.

5. The power tool as defined in claim 1, wherein the cooling-fan facing surface of the brush holder base extends at least to the rotating outer periphery of the cooling fan along the centrifugal direction of the cooling fan.

6. The power tool as defined in claim 1, wherein four brushes and four brush holders are disposed on the brush holder base such that two opposed brushes and two opposed brush holders define respective pairs.

7. The power tool as defined in claim 1, wherein the power tool is defined as a screwdriver or an impact driver.

8. A power tool, comprising:
a tool bit,
a housing and an electric motor that is housed in the housing to drive the tool bit,
the housing including a first space that accommodates the electric motor, vents through which the first space communicates with the outside of the housing and a second space that is adjacent to the first space and defines an inner space of the handgrip of the power tool body, the electric motor comprising:
an output shaft connected to the tool bit
a commutator and an armature that are fitted onto the output shaft and rotate together with the output shaft, brushes that supply current in sliding contact with an outer periphery of the commutator, brush holders that house the respective brushes, a brush holder base to which the brush holders are respectively secured, a cooling fan that is disposed between the brush holder base and the armature in the axial direction of the output shaft, the cooling fan rotating together with the output shaft, thereby taking in cooling air and discharging the cooling air in a centrifugal direction that crosses the axial direction of the output shaft, a cooling-fan facing surface formed on the brush holder base, wherein the cooling-fan facing surface faces the cooling fan and extends flat in the centrifugal direction of the cooling fan to guide the discharged cooling air from the cooling fan in the centrifugal direction of the cooling fan and a cooling-air control element that is formed on the brush holder base and prevents the cooling air from flowing from the first space to the second space.

9. A power tool, comprising:

a tool bit, a housing, and an electric motor that is housed in the housing and drives the tool bit, the electric motor comprising:

an output shaft connected to the tool bit side, a commutator and an armature that are fitted onto the output shaft and rotate together with the output shaft, brushes that supply current in sliding contact with an outer periphery of the commutator, brush holders that house the respective brushes, a brush holder base to which the brush holders are respectively secured, a cooling fan that is disposed between the brush holder base and the armature in the axial direction of the output shaft and rotates together with the output shaft, thereby taking in cooling air and discharging said air in a centrifugal direction that crosses the axial direction of the output shaft, a cooling-fan facing surface formed on the brush holder base, wherein the cooling-fan facing surface faces the cooling fan, is substantially flat, and extends from an inner edge of the brush holder base in the centrifugal direction of the cooling fan to guide the discharged cooling air from the cooling fan in the centrifugal direction of the cooling fan; and a heat conductive part that is formed in the brush holder base, the heat conductive part being connected to the brush holders and exposed on the cooling-fan facing surface, thereby allowing heat conduction from the brush holder side to the cooling-fan facing surface side.

10. A power tool comprising:

a tool bit, a housing, and an electric motor housed in the housing to drive the tool bit, the electric motor comprising:

an output shaft connected to the tool bit, a commutator and an armature that are fitted onto the output shaft and rotate together with the output shaft, brushes that supply current in sliding contact with an outer periphery of the commutator, brush holders that house the respective brushes, a brush holder base to which the brush holders are respectively secured, a cooling fan disposed between the brush holder base and the armature in the axial direction of the output shaft and rotates together with the output shaft, the cooling fan taking in a cooling air and discharging the cooling air in a centrifugal direction that crosses the axial direction of the output shaft, and a cooling-fan facing surface formed on the brush holder base, wherein the cooling-fan facing surface faces the cooling fan and extends flat in the centrifugal direction of the cooling fan to guide the discharged cooling air from the cooling fan in the centrifugal direction of the cooling fan, wherein the housing includes a first space that accommodates the electric motor, vents through which the first space communicates with the outside of the housing and a second space adjacent to the first space to define an inner space of the handgrip of the power tool body, and wherein the brush holder base includes a cooling-air control element that prevents the cooling air from flowing from the first space to the second space.

11. The power tool as defined in claim 10, wherein the brush holder base includes a plate piece formed partially along an outer periphery of the cooling fan at substantially the same curvature as said outer periphery such that the plate piece partially covers the outer periphery of the cooling fan in the radial direction to prevent the cooling fan from flowing from the first space to the second space.

* * * * *